Aug. 26, 1958  J. C. HOLLIS  2,848,908
PLANETARY SPEED CHANGE TRANSMISSION
Filed Dec. 10, 1953  3 Sheets-Sheet 1

Inventor
John C. Hollis
by: Carlson, Pitzner, Hubbard & Wolfe
Attys.

Aug. 26, 1958   J. C. HOLLIS   2,848,908
PLANETARY SPEED CHANGE TRANSMISSION
Filed Dec. 10, 1953   3 Sheets-Sheet 2

Inventor
John C. Hollis
by: Carlson, Pitzner, Hubbard & Wolfe
attys.

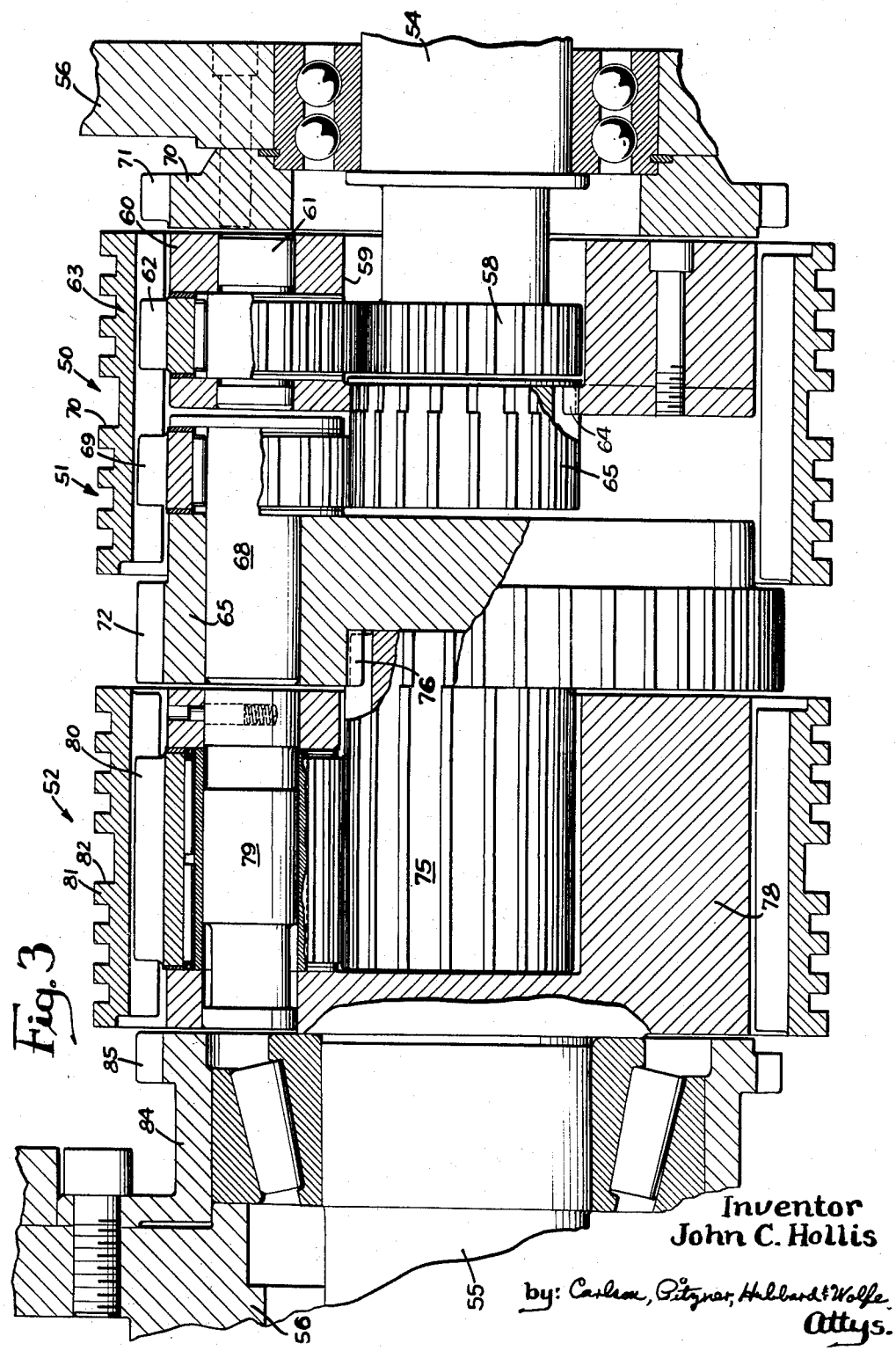

United States Patent Office 2,848,908
Patented Aug. 26, 1958

2,848,908

PLANETARY SPEED CHANGE TRANSMISSION

John C. Hollis, Fond du Lac, Wis., assignor to Giddings & Lewis Machine Tool Company, Fond du Lac, Wis., a corporation of Wisconsin Application December 10, 1953, Serial No. 397,410

11 Claims. (Cl. 74—769)

The present invention relates to speed change transmissions and, more particularly, to planetary transmissions of the type having constantly meshed gears brought selectively into driving operation to thereby afford various speed change ratios.

It is the general aim of the invention to provide a planetary speed change transmission of simplified and compact construction, which is small in size relative to its power transmitting capacity, and which is easily shifted to establish any one of several speed change ratios.

Consonant with the foregoing, it is a more specific object of the invention to provide a multispeed planetary transmission in which readily accessible reaction members or ring gears are shifted to effect various speed change ratios.

A further object is to provide a planetary speed change transmission having tandem planetary gear sets, each set having a ring gear axially shiftable between first and second positions to effect speed ratio changes, the mating element for the ring gears in their second positions being common to both.

Still another object is to provide, in a planetary transmission, for the minimization of misalinement of meshed gears which tends to develop upon torsional distortion of high torque transmitting members. Smoother operation of the gears and longer life with smaller parts is thus achieved in a transmission working under heavy loads.

Additional objects and advantages will become apparent as the following description proceeds, taken in conjunction with the accompanying drawings, in which:

Fig. 3 is similar to Fig. 1, illustrating a second embodiment of the invention.

While the invention has been illustrated and is described with reference to particular embodiments thereof, there is no intention that it thus be limited to such detail. On the contrary, it is intended here to cover all alterations, modifications, and equivalents falling within the spirit and scope of the invention as defined by the appended claims.

Figure 1:
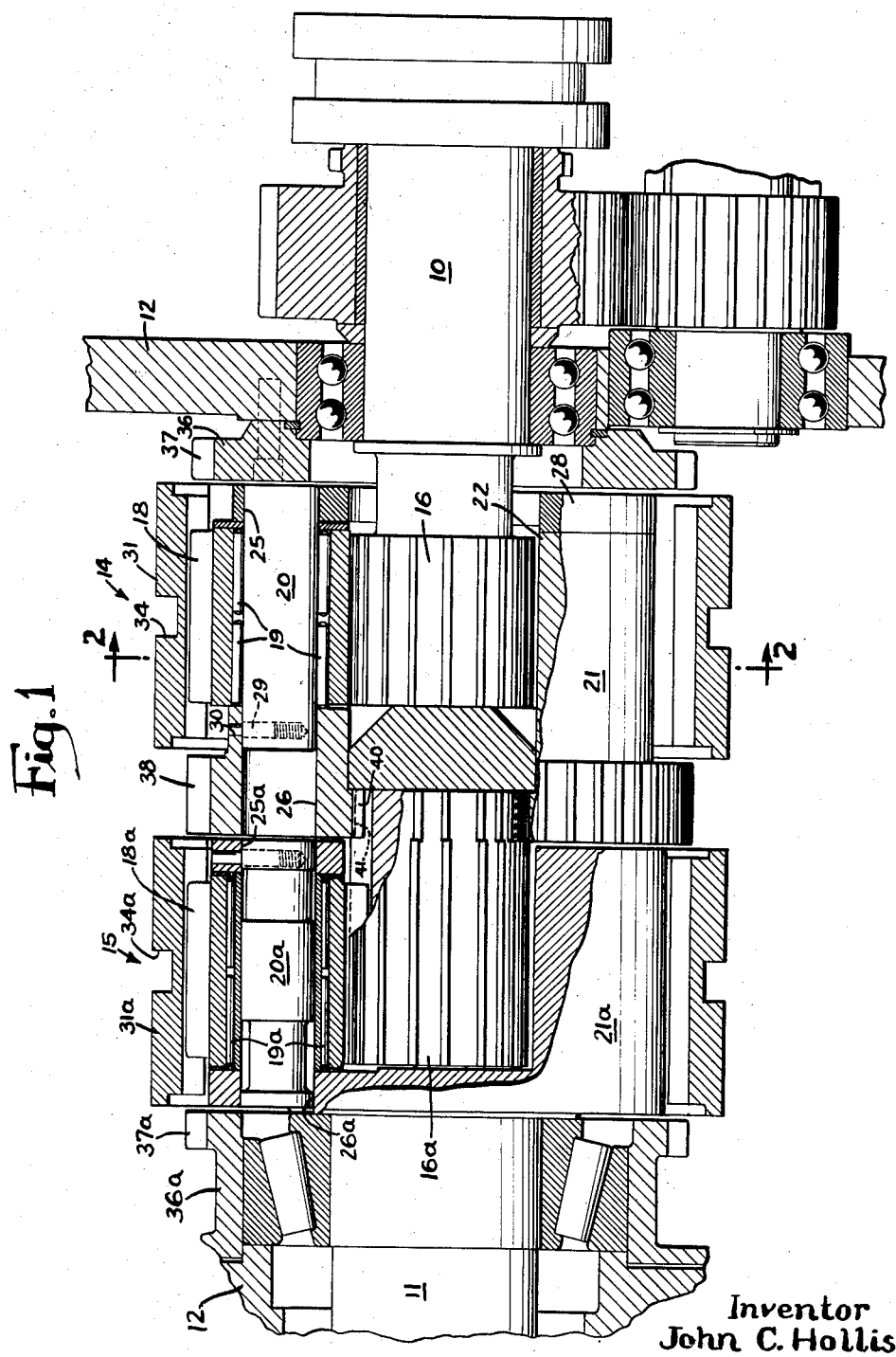
Figure 1 is a longitudinal sectional view of a planetary speed change transmission embodying the features of the present invention.
Figure 2:
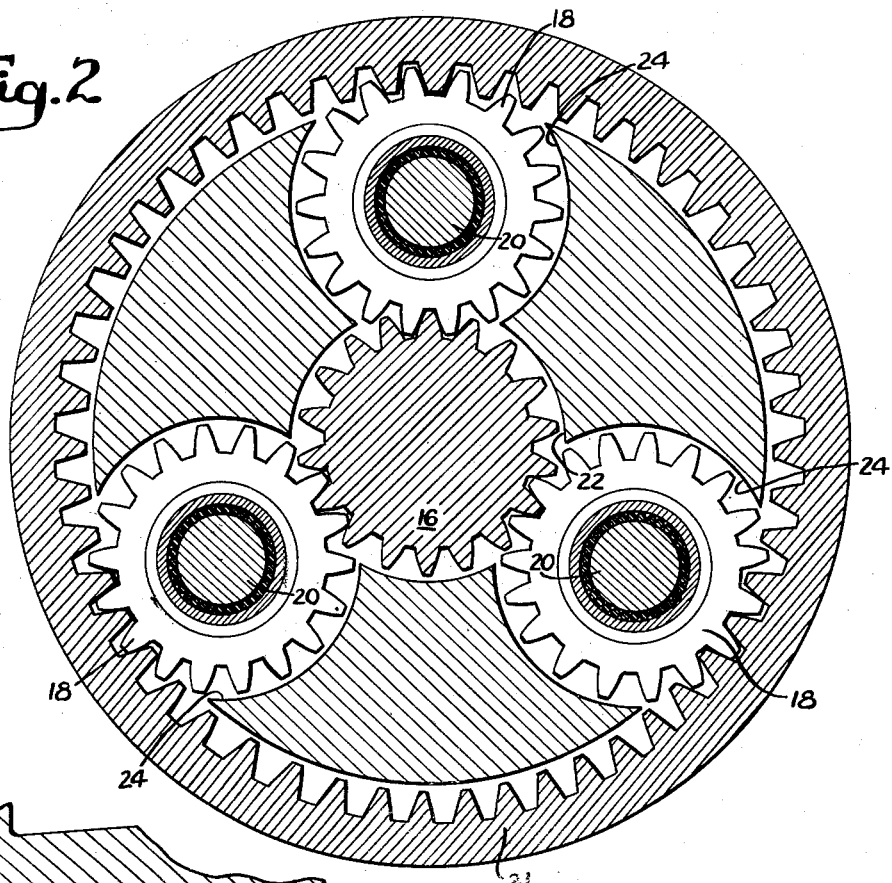
Fig. 2 is a cross-sectional view taken substantially along the line 2—2 in Fig. 1.

Referring now to the exemplary embodiment of the invention here shown in Figs. 1 and 2, the planetary speed change transmission is illustrated as interposed between intput and output shafts 10, 11 journaled in any suitable support member or housing 12. The input shaft 10 may be driven from any power source or prime mover (not shown), while the output shaft 11 may extend to drive any load or power-utilizing device (not shown). The arrangement here illustrated is especially advantageously employed in the drive mechanisms for machine tools, e. g., for the multispeed drive of spindles in horizontal boring, milling, and drilling machines. It will be understood, however, that the practice of the invention lends itself to general utility in numerous other applications.

The transmission as a whole in this instance includes two subsantially identical planetary gear sets 14, 15 connected in tandem relation. Each gear set 14, 15 is adapted, by the simple and unique construction to be described, to be rendered locked for direct drive, operative to produce a speed reduction of predetermined ratio, or neutral for disconnecting the input and output shafts 10, 11. A simple lineal shifting of elements effects these changes in each gear set.

The first planetary gear set 14 includes an input sun gear 16 formed integrally on or rigid with the intput shaft 10. A plurality of circumferentially spaced planet gears 18 are disposed around the periphery of the sun gear 16, meshing with the latter to be rotatably driven thereby. As here shown, three such gears 18 are spaced at 120° intervals around the sun gear 16 (Fig. 2). The planet gears are journaled by needle bearings 19 on respective ones of a corresponding plurality of studs 20 which are disposed in axial parallelism with the sun gear 16 at circularly spaced locations in a spider 21.

The spider 21 is generally annular in shape, having a central passage 22 in which the sun gear 16 is disposed, and three circularly spaced arcuate pockets 24 (Fig. 2) formed in the shape of incomplete cylinders for accommodating the corresponding planet gears 18. These pockets 24 are bounded at their axial ends by walls having circular openings 25, 26 into which the respective ends of the studs 20 are received. The latter are thus disposed coaxially in their respective pockets 24 and support the respective planet gears 18 with clearance from the side walls of the pockets. As shown most clearly in Fig. 1, the right end walls for the pockets 24 are provided by a circular bolted plate 28, the removal of which facilitates the assembly of the planet gears within the spider 21. Each stud 20 is retained in its illustrated position by suitable means, here shown as a spring biased detent 29 which snaps into a mating opening 30 as the left end of each stud 20 is inserted into its corresponding opening 26 in the planet carrier. This secures the studs 20 against both axial and rotational movement relative to the carrier and constitutes them firm supports for journaling the respective planet gears 18.

As thus far described, the sun gear 16 and the spider 21 constitute input and output members respectively for the planetary gear set 14. In accordance with the invention, a reaction member here shown as an internally toothed ring gear 31 is floatably disposed around the planet carrier 21, being meshed an axially sliding relation with the several planet gears 18. To permit axial shifting of the ring gear 31, its teeth are axially disposed, as are those of the sun gear 16 and planet gears 18.

Upon rotational input to the shaft 10 and sun gear 16, no output torque is supplied to the spider 21 if the ring gear 31 is free to spin relative to the housing 12 and the spider 21 in response to rotation of the planet gears 18. The gear set 14 is thus in neutral. On the other hand, if the ring gear 31 is locked to the housing 12 to be held stationary, it serves as a reaction member taking the torque of the planet gears 18 which in turn impart rotational torque to the spider 21. The speed change ratio between the input shaft or sun gear 16 and the spider 21 is determined by the relative diameters of the sun gear 16 and the planet gears 18. As here shown, the ratio of the gear diameters is chosen to provide a speed reduction in the order of four-to-one. Still further, if the ring gear 31 is locked fast to the planet carrier 21, rotation of the planet gears about their own axes is precluded and a direct drive from the input shaft 10 to the spider 21 is established.

In order to effect such connections of the ring gear 31, it is formed to be of greater axial length than the planet gears 18 and has an annular groove 34, in this instance, to be shifted axially by any well-known means, such as a shifting fork linkage (not shown) received in the groove. First locking means are provided rigid with the housing 12 to be engaged by the ring gear 31 and to hold it stationary upon shifting of the latter to a first predetermined axial position. As here shown, such locking means include an annular clutch member 36 bolted to a partition of the housing 12 and having external teeth 37 for matingly engaging the internal teeth of the ring gear 31 when the latter is shifted to the right. As explained above, when the ring gear 31 is thus held stationary a four-to-one speed reduction ratio is provided between input shaft 10 and the spider 21.

In order that the planetary gear set 14 be adapted to provide a direct drive, or one-to-one ratio, means are provided for locking the ring gear 31 to the spider 21 when the former is moved to a second predetermined axial position. In this instance, the spider 21 is provided at its left end with external clutch teeth 38 adapted to be meshed with the teeth of the ring gear 31 when the latter is shifted to the left. This locks the spider 21 and ring gear 31 for positive rotation in unison.

The second planetary gear set 15 is generally similar in construction to gear set 14, parts in the former being identified by the reference numerals employed for similar parts in the latter, with the distinguishing suffix "a" added. Thus, gear set 15 includes a sun gear 16a, a spider 21a carrying studs 20a, journaling planet gears 18a on needle bearings 19a, and a surrounding ring gear 31a having a groove 34a for receiving a shifter fork (not shown). The ring gear 31a is axially shiftable from the "neutral" position shown to a first predetermined axial position at which it is held stationary by the teeth 37a of a clutch member 36a rigidly mounted on the housing 12. It is also shiftable to a second predetermined position for engagement with the clutch teeth 38, thus locking the gear set 15 for direct drive as will appear more fully below.

The sun gear 16a, spider 21a, and the ring gear 31a thus form input, output, and reaction members, respectively, for the gear set 15. Tandem connection is provided between the sets 14 and 15 by internal clutch teeth or splines 40 on the spider 21 which are permanently engaged with mating teeth 41 integral with sun gear 16a. That is to say, the output member 21 of gear set 14 is drivingly connected with the input member 16a of gear set 15.

The output member 21a, on the other hand, is drivingly connected with the output shaft 11. The two as here illustrated are formed integrally for this purpose.

Shifting ring gear 31a to the left so that it is held stationary by clutch member 36a produces a four-to-one speed reduction ratio between sun gear 16a and spider 21a; shifting it to the right locks the ring gear with spider 21 and thus with sun gear 16a, thereby locking the set 15 and effecting direct drive from sun gear 16a to spider 21a. In the axially central position shown for ring gear 31a a "neutral" or disconnected condition obtains.

It is believed from the foregoing that the operation of the planetary transmission will now be clear. By way of summary, however, it may be stated that if both of the ring gears 31 and 31a are shifted to their first predetermined axial positions, i. e., to the right and left respectively, to be held stationary by the clutch members 36 and 36a, a four-to-one speed reduction is provided by each gear set 14 and 15, thereby resulting in a sixteen-to-one speed reduction from the input shaft 10 to the output shaft 11. When one of the ring gears 31 or 31a is shifted to second position, i. e., engaged with the clutch teeth 38, and the other left in its first position, a four-to-one speed reduction results between the input and output shafts 10 and 11. Still further, if both ring gears are shifted to lock with teeth 38 on spider 21, a direct drive through both gear sets obtains for a one-to-one speed ratio between shafts 10 and 11. Finally, if one of the ring gears 31 or 31a is shifted to its central or "neutral" position, the input and output shafts 10 and 11 are disconnected. By a simple axial shifting of reaction members, therefore, a sixteen-to-one, four-to-one, one-to-one, or neutral drive may be obtained. Three drive ratios of 16:1, 4:1, and 1:1 are obtainable in the above illustration because both gear sets 14, 15 were arbitrarily assigned reduction ratios of 4:1. However, it will be apparent that if the two tandemly connected gear sets 14 and 15 are given different individual speed change ratios, then a total of four possible over-all drive ratios will be available by shifting the two ring gears 31 and 31a to different positions.

It is to be particularly noted that the arrangement described is extremely simple and economical in construction for the speed changes afforded. What is still more important, the axial length and total diameter of the transmission are hardly increased beyond those required for a similar non-shiftable transmission. The present transmission is thus compact and particularly suited to many applications where space is at a premium. The ring gears 31 and 31a are unsupported except for contact with their corresponding planet gears 18 and 18a or clutch teeth 37, 37a and 38, and are therefore capable of limited lateral floating movement which serves to equalize the loads on the planet gears. Similarly, the spider 21 may float or automatically adjust itself since it is supported solely by the respective planet gears 18, thereby further serving to equalize the loads on the latter. Only three clutching or locking means 37, 37a, and 38 are required to make possible four drive ratios. It is to be observed that the common clutch teeth 38, which are here illustrated as integrally formed on the spider 21, are in effect also rigid with the tandem connection means 40, 41 and the sun gear 16a. Thus it will be apparent that the common locking means or clutch teeth 38 may be formed or carried on either the first output member (spider 21), the second input member (sun gear 16a), or the tandem connection means between those members, so long as both of the ring gears 31 and 31a are engageable with such common locking means.

Figure 4:
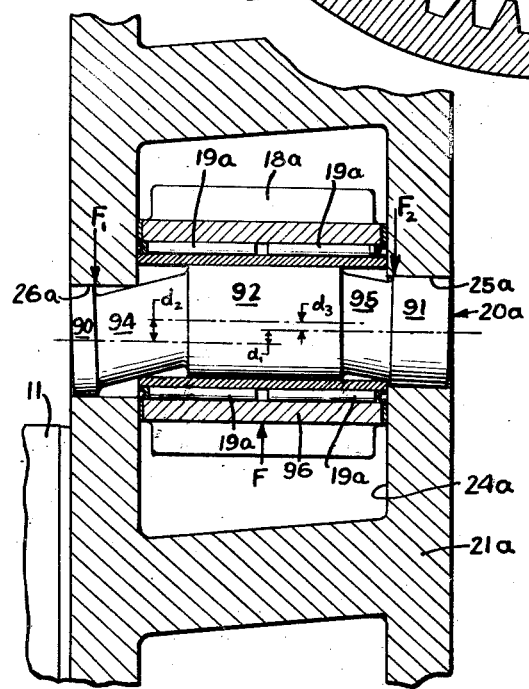
Fig. 4 is a detail view of means for mounting planet gears in a spider so as to eliminate misalinement due to slight deflections (shown greatly exaggerated) of the spider under heavy torque loads in accordance with the invention.

Turning now to the modified embodiment of the invention shown in Figs. 3 and 4, a planetary transmission is illustrated having three tandem planetary gear sets 50, 51, and 52. The first two gear sets 50, 51 are arranged in "dual" relation, i. e., employ a common reaction member. The transmission is interposed between input and output shafts 54, 55 journaled in a support housing 56. A sun gear 58 integral or fast on the input shaft 54 is inserted into a central opening 59 of a spider 60 in the first set 50. The spider 60 in turn carries circularly spaced studs 61 on which are journaled planet gears 62 meshed with the sun gear 58 and also with a surrounding internally toothed ring gear 63, which is relatively long in its axial dimension.

For tandem drive, connection is made between the gear sets 50 and 51 by permanently engaged clutch teeth in the nature of a splined fit 64 between the spider 60 and a sun gear 65 for the latter set. The gear set 51 in an organization similar to that for set 50, includes a spider 66 carrying circularly spaced studs 68 on which are journaled a corresponding plurality of planet gears 69 meshed with the sun gear 65 at their inner sides and with the surrounding internal ring gear 63 at their outer sides. The ring gear 63 thus serves as a reaction member for both gear sets 50 and 51 and is disposed in axially slidable, meshed relation with the planet gears of each set.

The ring gear 63 is adapted for axial shifting by means of an annular groove 70 defined therein for receiving a suitable shifter fork or other shifting means (not shown). A stationary clutch member 70 is provided rigid with the housing 56 and has clutch teeth 71 adapted to be engaged by the teeth of ring gear 63 when the latter is shifted to a first predetermined axial position, i. e., to the right. Means are provided for rigidly connecting the spider 66 and the ring gear 63, such means here shown as external clutch teeth 72 on the spider 66. The clutch teeth 72 are engageable with the internal teeth of ring gear 63 when the latter is shifted to a second predetermined axial position, i. e., to the left.

The gear set 51 is connected to drive set 52 by a tandem connection between the spider 66 and a sun gear 75 for the latter set. Such connection is here shown as a splined fit at 76 between mating teeth internally located on the spider 66 and externally located on the sun gear 75. The gear set 52 further includes a spider 78 which may be, as here shown, formed integrally with one end of the output shaft 55, and which carries a plurality of circularly spaced studs 79 journaling a corresponding plurality of planet gears 80 meshed with the sun gear 75. A reaction member in the form of an internally toothed ring gear 81 meshes with the several planet gears 80 in axially slidable relation therewith. It is provided with an annular groove 82 adapted to receive any suitable form of shifter fork (not shown) for effecting such axial movement.

In a manner previously described in connection with ring gear 63, ring gear 81 is adapted by locking means to be held stationary with the housing 56 or to be rigidly connected with the clutch teeth 72 upon proper axial shifting.

Such locking means are here provided in the first instance by a clutch member 84 rigidly mounted on the housing 56 which includes an annular array of clutch teeth 85 adapted to be engaged with the teeth of ring gear 81 when the latter is shifted to a first predetermined position, that is, to the left. Similarly, the teeth of ring gear 81 are adapted to interfit to clutch teeth 72 when the ring gear is shifted to a second predetermined position, that is, to the right.

It is to be noticed that the axial length of the teeth for the sun gears in gear sets 50 and 51 is considerably shorter than the length for the teeth of sun gears 75 and planet gears 80 in gear set 52. This increased length in the latter gear set is provided in order to transmit the greater torque occasioned by speed reduction through the transmission. It will be understood, of course, that the gears in set 50 could be shorter in length than those in set 51 inasmuch as the former are not called upon to transmit as great a torque. However, for purposes of production economy they may be made identical as shown.

The operation of this second embodiment will be reasonably clear from the foregoing description. However, it may be briefly summarized as follows. Shifting of ring gear 63 to the right to be held stationary by clutch member 70 effects a speed reduction through both gear sets 50 and 51. For example, the speed reduction between input shaft 54 and spider 60 may be in the order of four-to-one, and the reduction ratio between sun gear 65 and spider 66 may also be in the order of four-to-one, thereby providing a sixteen-to-one reduction between the speeds of the input shaft 54 and spider 66. If the ring gear 81 is shifted in the left and likewise held stationary by clutch member 84, gear set 52 provides a further speed reduction, say a four-to-one ratio, between the sun gear 75 and the spider 78. Thus, the speed reduction ratio between input and output shafts 54 and 55 is sixty-four-to-one. If ring gear 81 is shifted to the right to be locked rigid with sun gear 75 by clutch teeth 72, a direct drive is provided through the gear set 52, thus affording a speed reduction of sixteen-to-one through the transmission from input shaft 54 to output shaft 55. Still further, if ring gear 81 is shifted to the left and ring gear 63 also shifted to the left to engage clutch teeth 72, the first two gear sets 50 and 51 provide a direct drive from input 74 while gear set 52 provides a four-to-one speed reduction ratio. And if both ring gears 63 and 81 are shifted into engagement with clutch teeth 72, a direct drive is provided through all gear sets and between input and output shafts 54 and 55. Finally, if the ring gear 81 is centrally positioned as shown, a disconnected or "neutral" condition obtains. In summary, then, the transmission described provides a sixty-four-to-one, sixteen-to-one, four-to-one, one-to-one, or neutral drive connection between input and output shafts 54 and 55 depending upon the positions to which the two ring gears 63 and 81 are shifted.

In a planetary transmission affording a relatively great speed reduction, torque exerted by the planetary gears and studs on the slowly turning output spider may become relatively great. Unless such output member is made unduly large in size, a torsional deflection or twisting may occur. Although such twist is only slight, it tends to skew the studs from parallelism with the axis of the spider due to the fact that the angle of twist is greater at the unsupported or non-driving end of the spider. This in turn may skew the planet gears journaled on the studs so that the planet gear teeth are no longer accurately alined with the meshing sun gear and ring gear teeth. Inordinate noise and wear may result.

In accordance with another aspect of the invention such difficulty is substantially overcome by providing studs which are weakened on either side of their medial portions which support the juornaled planet gears such that the opposite end portions are deflected by different amounts under the forces exerted by the planet gears on the medial portions. The deflections of the end portions are such as to leave the medial portions of the studs in parallelism with the common spider, ring gear, and sun gear axis, with the result that the planet gear teeth are not misalined from the sun gear and ring gear teeth.

In this instance such compensating action is achieved by the solid cross-section studs 20a formed and mounted in the spider as shown in Fig. 1. Fig. 4 is an enlarged view of one such stud, with a portion of the spider 21a developed or "rolled out" to more clearly show (to an exaggerated degree) the torsional deflection or twisting of the spider and the compensating deflection of the stud. As seen most clearly in Fig. 4, the stud 20a is formed to have full diameter end portions 90 and 91 which are received in openings 25a and 26a defined in the end walls of the planet gear pocket 24a of the spider 21a. Additionally, the stud 20a has a full diameter medial portion 92 bounded on either side by sections constructed to have less resistance to bending moments. As here shown, sections 94 and 95 are weakened by forming them to have a smaller cross-sectional area than the medial portion 92, i. e., the sections 94 and 95 are relieved or reduced in diameter. The section 94 nearest the supported end of the spider, i. e., nearest the shaft 11, is made to have less resistance to bending moments by being reduced more in diameter and made greater in axial length than the section 95, so that the two sections will deflect different amounts when the stud is loaded at the medial portion 92. This, as explained below, compensates for the greater angular deflection of the free end of the spider 21a when the latter is subjected to heavy torques.

For journaling the planet gear 18a along its entire axial length yet supporting it from the medial portion 92, a sleeve 96 is slipped over the medial portion, the sleeve being of the same axial length as the planet gear. The needle bearings 19a journal the planet gear on the sleeve.

When the planetary gear set is in operation, the planet gear 18a exerts a force F on the medial portion 92 of the stud 20a, which is opposed by reaction forces $F_1$ and $F_2$ set up in the spider and acting on the end portions 90 and 91 of the stud. Consequently, the spider 21a and the output shaft are given output torque and rotation. However, the spider is twisted under such torque, such twisting being exaggerated in Fig. 4. The degree of twisting is greater at the unsupported end of the spider. As a result, the openings 25a and 26a do not remain alined but become separated relative to one another as shown by the distance $d_1$ between their axes. Nevertheless, the stud 20a is loaded, in the nature of a beam, at the center and the ends by the force F and the reaction forces $F_1$ and $F_2$. The weakened sections 94 and 95 therefore deflect as shown, the deflection $d_2$ of the longer, thinner section 94 being greater than the deflection $d_3$ of the shorter, thicker section 95 taken relative to the center of the medial portion 92. By proportioning the relative diameters and lengths of the sections 94 and 95, the deflection $d_2$ is caused to be substantially equal to the sum of the other deflections, i. e., $d_1$ plus $d_3$. By this arrangement, the medial portion 92 does not become skewed along a line connecting the centers of the openings 25a and 26a, but remains substantially in parallelism with the common axis of the spider, sun gear, and ring gear. The sleeve 96, bearings 19a, and the planet gear 18a are thus not skewed, and the teeth of the latter remain alined with the meshing teeth of the sun gear and ring gear. No undue noise and wear on the gear teeth or bearings occurs. Longer life with smoother operation for relatively small parts under heavy load is thus achieved.

I claim as my invention:

1. In a planetary speed change transmission, the combination comprising a housing, input and output shafts journaled in said housing, two planetary gear sets and means connecting them in tandem between said shafts, each of said sets having an axially slidable internally toothed ring gear, two sets of stationary locking teeth on said housing engageable by respective ones of said ring gears upon shifting of the latter to first predetermined axial positions, the first of said sets having a spider connected in driving relationship with the second of said sets, and locking teeth rigid with said spider engageable by either of said ring gears when the latter are shifted to second predetermined positions, said transmission thereby providing disconnection of said shafts when neither of said ring gears is in any of said predetermined positions, and providing a first speed change ratio when both ring gears are shifted to their first predetermined positions, a second speed change ratio when both ring gears are shifted to their second predetermined positions, and a third speed change ratio when one ring gear is in its first and the other ring gear in its second predetermined position.

2. A planetary speed change transmission comprising, in combination, a stationary support; input and output shafts journaled in said support; a first planetary gear set having a sun gear driven by said input shaft, a spider rotatably surrounding said sun gear, a plurality of planet gears journaled by said spider and meshed with said sun gear, an annular internally toothed ring gear surrounding said spider and meshed in axially slidable relation with said planet gears; a second planetary gear set having a sun gear, a spider, planet gears, and an annular internally toothed ring gear surrounding spider and meshed in axially slidable relation with the planet gears; said second spider being rigid with said output shaft; said first spider being drivingly connected with said second sun gear; two arrays of clutch teeth on said support engageable by said first and second ring gears, respectively, upon axial shifting thereof to first predetermined positions; and an array of clutch teeth rigid with said first spider engageable by either of said ring gears upon axial shifting thereof to second predetermined positions to thereby lock the respective gear sets.

3. In a planetary speed change transmission, the combination comprising first, second and third planetary gear sets, means connecting said sets in tandem driving relation, said first and second gear sets having a common first ring gear meshed with their planet gears and floatably disposed with freedom for axial movement, said third planetary gear set having a second ring gear meshed with its planet gears and floatably disposed with freedom for axial movement, means for locking either of said ring gears to prevent its rotation upon axial shifting thereof to first predetermined positions, and common means engageable by either or both of said ring gears for rigidly locking the latter to the tandem connection means between said second and third gear sets upon axial shifting of said ring gears to second predetermined positions.

4. A planetary speed change transmission comprising, in combination, a support member; input and output shafts journaled by said support member; a first planetary gear set including a sun gear drivingly connected with one said shafts, a spider, and planet gears in said spider meshed with said sun gear; a second planetary gear set including a sun gear drivingly connected with said first spider, a second spider, and planet gears in the spider meshed with the sun gear; a first sleeve-like internally toothed ring gear surrounding and meshed in axially slidable relation with the planet gears of both said first and second sets; a third planetary gear set including a sun gear drivingly connected with said second spider, a third spider rigid with said output shaft, planet gears on the spider, and a second internally toothed ring gear surrounding and meshed in axially slidable relation with the planet gears; two arrays of locking teeth on said support member positioned to be engaged by respective ones of said ring gears when the latter are shifted to first predetermined axial positions; and an array of locking teeth rigid with said second spider positioned to be engaged by either one of said ring gears upon shifting of the latter to second predetermined axial positions.

5. In a planetary transmission, the combination set forth in claim 2 in which the planet gears of the second set are journaled each on one of a corresponding plurality of studs carried at their ends by the second spider, each of the studs having a medial portion supporting the corresponding planet gear and weakened sections on either side of the medial portion, that weakened section nearest the output shaft being constructed to have less resistance to bending moments than the other weakened section, whereby the studs are deflected to compensate for torsional deflection of the spider thereby leaving the medial portions and planet gears in axial parallelism with the sun gear and ring gear when the transmission is working under heavy loads.

6. A planetary speed change transmission as set forth in claim 4 comprising further a plurality of studs supported at their extremities in the third spider to rotatably support the planet gears of the third gear set, each of said studs having a medial portion for supporting its respective planet gear and weakened sections of reduced diameter on either side of the medial portion, the weakened section nearest the output shaft having less resistance to bending moments than the other weakened section, whereby under heavy load the forces exerted by the planet gears on the studs not only torsionally twist the spider but also deflect the stud to compensate for such twist and leave the medial portion in parallelism with the spider axis.

7. In a planetary speed change transmission, the combination comprising a planet carrier having first and second axially spaced end walls the first of which is supported by a shaft and the second of which is effectively supported only from the first, said walls having axially alined openings, a stud solid in cross-section having its opposite ends received in respective ones of said openings, said stud having a medial portion and sections on either side of said medial portion which are constructed to have less resistance to bending moments than the medial portion, that section nearest said first wall having less bending resistance than the section nearest said second wall, and a planet gear rotatably mounted on the medial portion of said stud, whereby torsional deflection of said planet carrier which misalines said openings results in unequal deflection of said stud sections to leave said medial portion and said planet gear parallel with the axis of said spider.

8. In a planetary speed change transmission, the combination comprising first and second planetary gear sets, means connecting said sets in tandem driving relation, said first and second gear sets respectively having first and second reaction ring gears floatably disposed with freedom for axial movement, means for locking either of said ring gears to prevent its rotation upon axial shifting thereof to first predetermined positions, and common means engageable by either of said ring gears upon axial shifting thereof to second predetermined positions for locking either of said ring gears to said tandem connection means.

9. In a planetary speed change transmission, the combination of a spider which is generally annular in shape and has axially spaced, apertured wall portions the first of which is supported by a shaft and the second of which is supported from the first, with a plurality of studs of solid cross-section and each having its ends received for support in the respective wall portions, each of said studs having weakened sections of reduced diameter on either side of a medial portion, said reduced diameter section nearest said first wall being formed to have less resistance to bending moments than the other reduced diameter section, and planet gears rotatably supported on the medial portions of the respective studs, whereby forces exerted by the planet gears on the studs which result in torsional distortion of the spider also result in a compensating deflection of said weakened sections, leaving said medial portions substantially in parallelism with the axis of said spider.

10. In a planetary speed change transmission, the combination comprising an annular spider having axially spaced end walls formed with pluralities of axially alined openings, a first of said end walls being supported by a shaft member and the second of said end walls being effectively supported by the first, a plurality of studs each inserted through alined pairs of the openings in said end walls, said studs each being formed with sections having reduced cross section on either side of a medial portion and inwardly of the extremities received in said openings, the section nearest said first end wall being of greater axial length and lesser cross section than the section nearest said second end wall, a plurality of planet gears each rotatably mounted on the medial portion of one of said studs, a sun gear centrally received within said spider and meshed with said planet gears, and an internally toothed ring gear surrounding said spider and meshed with said planet gears, whereby forces exerted by said planet gears on said studs which result in torsional deflection of said spider also result in compensating deflection of said studs along said reduced sections to leave said medial portions and said planet gears substantially in axial parallelism with said sun gear and ring gear.

11. In a planetary speed change transmission, the combination set forth in claim 9 further characterized in that the planet gears are of greater axial length than the medial portions of the studs, sleeves substantially the same axial length as the planet gears are disposed on the medial portions, and bearings journal the planet gears on the sleeves.

References Cited in the file of this patent

UNITED STATES PATENTS

| 1,514,872 | Starr | Nov. 11, 1924 |
| 2,043,261 | Neuland | June 9, 1936 |
| 2,052,815 | Wilsing | Sept. 1, 1936 |
| 2,331,684 | Henningsen | Oct. 12, 1943 |
| 2,498,295 | Peterson et al. | Feb. 21, 1950 |
| 2,569,249 | Carr | Nov. 17, 1953 |

FOREIGN PATENTS

| 562,672 | France | Nov. 16, 1923 |